March 3, 1936. R. MÜLLER ET AL 2,032,549
TREATING SOLID CELLULOSE DERIVATIVES
Filed Feb. 21, 1934
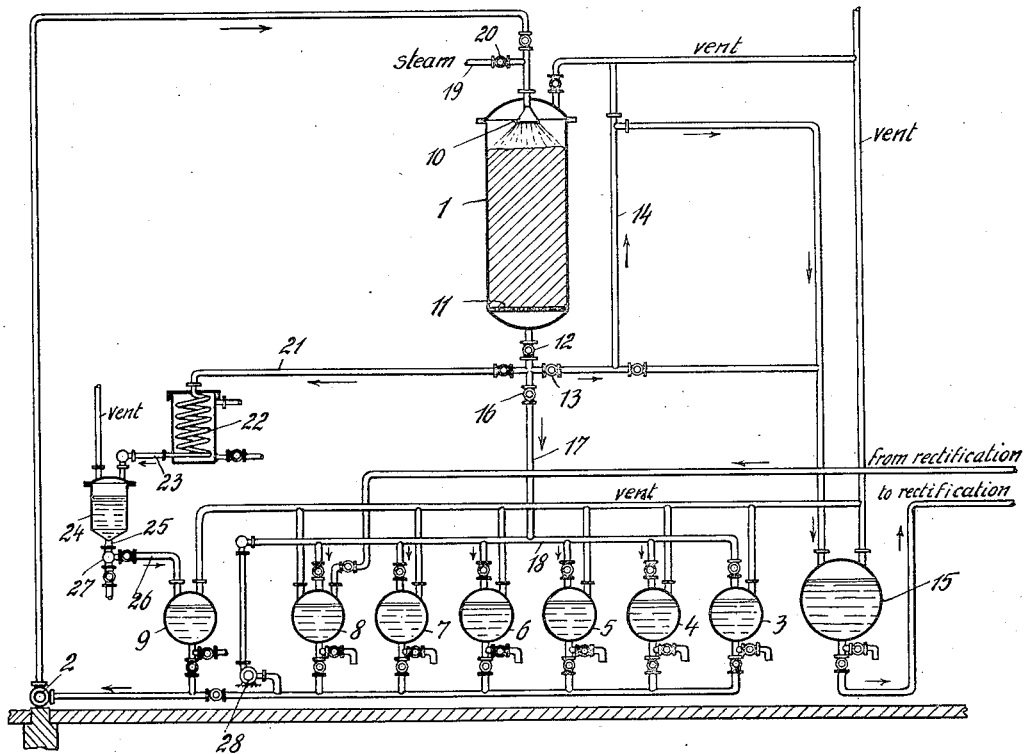
Inventors:
Richard Müller, Martin Schenck
and Wilhelm Wirbatz
by Karl Michaelis
Atty.

Patented Mar. 3, 1936

2,032,549

UNITED STATES PATENT OFFICE 2,032,549

TREATING SOLID CELLULOSE DERIVATIVES

Richard Müller and Martin Schenck, Berlin-Schoneberg, Mannheim, and Wilhelm Wirbatz, Mannheim-Waldhof, Germany, assignors to C. F. Boehringer & Soehne G. m. b. H., Mannheim-Waldhof, Germany Application February 21, 1934, Serial No. 712,438
In Germany February 25, 1933

9 Claims. (Cl. 260—102)

Our invention refers to the production of cellulose derivatives and more especially solid fibriform derivatives. It is an object of our invention to provide means whereby these products can be freed from the liquids, immiscible with water, which had been used in their production or further treatment.

As is well known to those skilled in the art the production and further treatment of cellulose derivatives in the fibrous form characteristic of the starting material offers the advantage that the liquids resulting in the reaction can be recovered unaltered. It is for instance possible, when esterifying cellulose with fatty acid anhydrides under preservation of the fibrous structure of the cellulose, to recover the acid anhydride in excess together with such diluting media and additions, which may be present, by separating them from the esterification products by centrifugation and to separate the components of the liquid mixture by distillation, while if the cellulose esters are dissolved and the esterification products have been precipitated with water, those parts of the acid anhydride, which have not been consumed in the reaction, are converted by hydrolyzation into the less valuable acids.

While the separation by centrifugation enables the liquids obtained in producing and further treating fibriform cellulose derivatives as well as the dissolved cellulose derivatives precipitated from their solutions by means of benzene or other precipitants to be recovered in a comparatively simple manner, considerable difficulties are encountered in freeing the cellulose derivatives from the remainder of liquids non-miscible with water, such as hydrocarbons, halogenated hydrocarbons, ethers, esters or the like, which were used in their production or further treatment, as completely as is necessary in order to obtain pure and stable products. The methods hitherto used for this purpose mostly consist in a combination of mechanical pressing or centrifuging and digestion of the loosened masses with the washing liquors in suitable churns. The steps of pressing or centrifuging and digestion, which in order to be successful must be gone through several times, require much time, manual labour and energy and very great quantities of washing liquors, which latter, being mixed with the liquids to be removed, must subsequently be subjected to further treatment for separation and recovery in large apparatuses which again consume much energy. On the other hand, if the esterification products are merely washed on the suction filter, centrifugal or filter press, by spraying on or otherwise applying the washing liquor and subsequently removing same by sucking, centrifuging or pressing, even if these operations are gone through repeatedly, no uniformly pure product is obtained, since the permeability of the solid masses to be washed greatly differs at different points and the washing liquors will have the tendency of passing through the points offering the least resistance to their passage, whereby less permeable parts of the mass will not be freed or only incompletely freed from the adhering liquids.

We have now found that with small quantities of washing liquors to be subsequently regenerated, the liquids used in the production and further treatment of the cellulose derivatives cannot only be recovered in a favorable form, but can also be removed quickly and completely, if these derivatives are freed from the adhering liquids by a displacing process, carried through with the aid of agents, which are inert relative to the derivatives and to the liquids to be displaced, but miscible with these liquids and either soluble in water or volatile together with water vapors (steam), so that they can be removed by means of water in liquid or vaporous form (steam).

By "displacing process" we intend to designate any so-called washing process which is so conducted that the quantity of liquid supplied to the material to be freed from a liquid adhering to it corresponds to, but not substantially exceeds the quantity of adhering liquid allowed to run off per unit of time, so that the adhering liquid is merely supplanted by the washing liquid and the volume total of the liquid enclosed in the fibrous material plus the liquid above this material remains practically unchanged.

Obviously in a displacing process no repeated stirring and removal of liquid by pressing are required, and the cellulose derivatives can be freed from the liquids and purified in one and the same container, for instance in a diffusor. In some cases the cellulose derivatives need not even be placed in a separate displacing vessel, but by using suitably designed reaction vessels it will frequently be possible to produce, treat further and free the cellulose derivatives from the adhering liquids by displacement in a single apparatus.

The liquid separation by displacement also offers the further advantage that the solid products never become dry but are always covered with liquid and therefore remain in a state of swelling which is particularly favorable for the washing step. The quantity of displacing agent, which must be regenerated, is comparatively limited, since only a small percentage of this agent is required to mix with the liquid to be displaced. If the displacing process is carried through correctly, the displacing agent will not meet obstructed or difficultly accessible passages, but will everywhere take the place of the liquids to be displaced and will in this manner free the cellulose derivatives from these liquids altogether.

The displacing process may for instance be carried through in a diffusor which in its simplest form may be a vessel provided with a perforated bottom, or in a displacing worm or, in certain cases, also in a suitable centrifugal or the like.

As means for displacing the liquids from the cellulose derivatives we may use any inert liquors, such as for instance acetone, dioxan or acetonitrile, which under the conditions of operation prevailing in each individual case act as solvents for the liquids, immiscible with water, which shall be displaced, or for the constituents thereof, which are immiscible with water, these liquids being soluble in water or, in the case of benzene or the like, volatile with steam under different conditions of pressure. Preferably the displacing agents differ from the liquid to be displaced as to their specific gravity.

By again displacing or dissolving these displacing agents with water or by distilling them off with steam, we obtain cellulose derivatives which are practically free from the liquids used in their production or further treatment and which can in certain cases be directly dried and treated further without requiring another washing operation.

The use of displacing agents volatile with steam, but little or not soluble in water offers the particular advantage that these agents can readily be separated from the mixture containing their condensed vapors and condensed water, so that there is no need for concentrating or otherwise treating them.

We have found that in actual practice the same liquors, such as benzene, toluene, benzine, carbontetrachloride or other halogenated hydrocarbons, ethers, esters or their mixtures, may be used, which have already been suggested as the means for preserving the fibrous structure of the cellulose when converting same into its derivatives.

If a mixture of different liquid components shall be removed, as will be the case for instance in the process of acetylation of cellulose under preservation of its fibrous form, where a mixture of acetic acid, acetic anhydride, benzene and certain residual catalysts remains in the reaction mixture, it will be particularly advantageous to displace the liquid, preferably after neutralization of the catalyst still present, by means of the same liquor (such as for instance benzene) volatile with steam, which already forms a component of the mixture of liquids to be displaced.

Owing to the slowly proceeding continuous penetration of the displacing liquor through all the parts of the substance to be treated a product is obtained, which is much lighter coloured and contains much less impurities than is obtainable in the usual washing of the product after centrifugation or pressing. In consequence thereof we are frequently in a position, if an altogether colorless product shall be produced, to dispense with a subsequent bleaching step, thereby saving additional costs and preventing the quality of the products from being impaired.

We are aware that in the production of cellulose nitrate it has already been suggested to displace the nitric acid, after the reaction has come to an end, with water. However in that case a liquid miscible with water is replaced by water and therefore the difficulties encountered when trying to remove the last traces of liquids not miscible with the water do not arise at all. On the other hand water is not inert relative to the nitric acid, but may lead to an evolution of heat which in the presence of the acid may be injurious to the cellulose. Therefore this displacing process has not been used in actual practice.

Obviously our process is particularly applicable in the case of all reactions in which cellulose or substances containing same are converted without previous dissolution or gelatinization of the fibres into derivatives, such as simple or mixed esters or ethers or ether esters, or in which such derivatives are subjected to treatment with other agents, while their fibrous structure is preserved, the liquids remaining over at the end of the reaction being not miscible with water and not simply removable with water. We may however treat by the same process also finely pulverulent or flocculent cellulose derivatives, such as are obtainable for instance by precipitation with organic liquids.

If the cellulose derivatives show a tendency to gelatinize under the conditions of operation, care should be taken to avoid pressure, which might lead to a sticking together.

Preferably the liquids adhering to the cellulose derivatives are displaced from above downwardly in cases where the specific weight of the displacing liquid is lower than that of the liquid to be displaced, and from below upwardly, if the specific weight of the displacing liquid is higher. The subsequent washing out with water or steam is then effected in the same direction. However, if the displacing liquid contains higher boiling constituents, it is always advantageous to wash out from above, since the displacing liquid is thus removed in a quicker and more thorough manner.

In the practical operation of our process, when operating on a large scale, we may proceed for instance as follows, reference being had to the diagram shown in the drawing accompanying this specification and forming part thereof, which illustrates by way of example the apparatus adapted for use in connection with the operation of our invention, in which 1 is a container for the cellulose acetate and 10 is a shower for sprinkling onto the acetate the displacing liquor, while 3 . . . 9 are vessels connected in parallel for the reception of the displacing liquor exhausted from the container 1, 15 being a receiver designed to take up the displaced liquid.

When a cellulose triacetate is produced, for instance in accordance with the prescription given in French patent specification 734,018, there result at the end of the esterifying reaction besides 170 parts of the fibriform cellulose ester, 1600 parts of a mixture consisting of the remainder of acetic anhydride, the acetic acid, sulfur dioxide, benzine, benzene and some perchloric acid neutralized with sodium acetate, the specific gravity of the mixture being .950.

The cellulose acetate and the liquid mixture adhering to it are enclosed in a heat-insulated container 1, into which 2400 parts by volume of a 1:1 mixture of benzine and benzene are gradually forced by means of a pump 2. This mixture is withdrawn from the vessels 3 . . . 9 containing the displacing liquor which resulted in the preceding displacing process and which, owing to the purpose for which it had been used, contains some acetic acid, the percentage gradually dropping from about 8% in the vessel 3 to about .2% in the vessel 9. The specific gravity of the liquor in these vessels may vary between about .820 and .795. In proportion as the displacing liquor runs from the shower 10 into the container 1, the liquid to be displaced runs through the perforated bottom 11, valves 12 and 13 and overflow tube 14 to the receiver 15. Into this receiver is further conducted about the 3- to 4-fold quantity, calculated on the weight of the ester, of displacing liquor. After this has been effected, the valve 13 is closed, the valve 16 opened and the liquor now flows through pipes 17 and 18 into the vessels 3 to 7, one after the other. These vessels may however also be made to communicate with each other and with the vessel 8, if it is desired to vary the composition of the liquid contained therein.

The mixture of benzine and benzene, which ultimately remains over in the cellulose acetate in container 1, is then expelled by introducing steam through pipe 19, valve 20 and shower 10 into this container. Until the container and the cellulose acetate have been thoroughly heated up, a considerable part of the mixture of benzine and benzene may be recovered free from water. The steam distillate which is thereafter obtained, on escaping through pipe 21, cooler 22 and pipe 23 into the separator 24, is here subjected to separation and the mixture of benzine and benzene recovered in the separation step is introduced into the vessel 9 for further use through pipes 25, 26 and valve 27. Thus the bulk of the displacing liquor may directly be re-used. We need rectify merely that portion of the displacing liquor, which had been introduced together with the acetylation liquor into the receiver 15. The mixture of benzine and benzene recovered in this rectification step is sucked by means of the pump 28 into the vessel 8 to be used in another displacing operation or for diluting the liquor in the vessels 3 to 7.

If the cellulose acetate, having thus been freed from the residual esterification mixture, still contains traces of acetic acid, the washing out of these traces may be effected right in the container 1. To this end water is forced in, until the cellulose acetate is submerged altogether. Since it still contains the heat imparted to it during the steaming process and is therefore swollen, the washing out of the last traces is greatly expedited. The washing may either be effected by displacement or the washing water may be left in the container 1 for some time and be then expelled by means of steam. In this case no centrifugation of the acetate is required, this step being replaced by the steaming operation. The hot steamed cellulose acetate, which now only contains about 60% water, on being withdrawn from the container, is dried directly.

In some cases and more especially if displacing the liquid by means of a readily volatile substance such as ether, benzene or the like, the use of water or steam may also be dispensed with, the liquid being simply evaporated by evacuation, and/or by supplying heat. If, in this case, the material must be washed with water for purification, small quantities of water may be added in one or two portions to the material mixed with the displacing liquid such as benzene and the whole intimately mixed by stirring the mixture or by tilting the vessel or in some other suitable manner, thereby dissolving the water-soluble matter adhering to the material under treatment and thereafter separating it from the material and the benzene together with the water. The washing procedure is furthered by the swollen state of the material maintained by the presence of the liquid used for treating the same. If desired, other substances such as alkalis, for instance bicarbonate of soda, may be added to the washing water, whenever any residual acid shall be removed from the fibrous material, or an acid may be added, if basic constituents shall be removed.

Various changes may be made in the details disclosed in the foregoing specification without departing from the invention or sacrificing the advantages thereof.

We claim:—

1. The method of freeing solid and more particularly fibriform organic cellulose derivative material from a liquid immiscible with water, with which it is imbibed, without a substantial reduction of the volume of liquid enclosed by the material under treatment, which comprises causing the liquid covering the material to run off, while at the same time feeding to the material a quantity, substantially equal to the quantity of liquid running-off, of an organic liquor, which is inert relative to said material and to the running-off liquid, but is miscible with this liquid, the rate of feed of said liquor being such that the volume of liquid matter enclosed in and surmounting said material remains practically unchanged and the liquid is merely supplanted by said liquor which is thereafter expelled.

2. The method of freeing solid and more particularly fibriform organic cellulose derivative material from a liquid immiscible with water, with which it is imbibed, without a substantial reduction of the volume of liquid enclosed by the material under treatment, which comprises causing the liquid covering the material to run off, while at the same time feeding to the material a quantity, substantially equal to the quantity of liquid running-off, of an organic liquor, which is inert relative to said material and to the running-off liquid, but is miscible with this liquid, and volatile with steam, the rate of feed of said liquor being such that the volume of liquid matter enclosed in and surmounting said material remains practically unchanged and the liquid is merely supplanted by said liquor which is thereafter expelled.

3. The method of freeing solid and more particularly fibriform organic cellulose derivative material from a liquid immiscible with water, with which it is imbibed, without a substantial reduction of the volume of liquid enclosed by the material under treatment, which comprises causing the liquid covering the material to run off, while at the same time feeding to the material a quantity, substantially equal to the quantity of liquid running-off, of an organic liquor, which is inert relative to said material and to the running off liquid, but is miscible with this liquid, the rate of feed of said liquor being such that the volume of liquid matter enclosed in and surmounting said material remains practically unchanged and the liquid is merely supplanted by said liquor which is thereafter expelled by washing with water.

4. The method of freeing solid and more particularly fibriform organic cellulose derivative material from a liquid immiscible with water, with which it is imbibed, without a substantial reduction of the volume of liquid enclosed by the material under treatment, which comprises causing the liquid covering the material to run off, while at the same time feeding to the material a quantity, substantially equal to the quantity of liquid running-off, of an organic liquor, which is inert relative to said material and to the running-off liquid, but is miscible with this liquid, the rate of feed of said liquor being such that the volume of liquid matter enclosed in and surmounting said material remains practically unchanged and the liquid is merely supplanted by said liquor which is thereafter expelled by washing with water vapor.

5. The method of freeing solid and more particularly fibriform organic cellulose derivative material from a liquid mixture, with which it is imbibed and which contains a liquid immiscible with water, without a substantial reduction of the volume of liquid enclosed by the material under treatment, which comprises causing the liquid covering the material to run off, while at the same time feeding to the material a quantity, substantially equal to the quantity of liquid running-off, of an organic liquor, which is inert relative to said material and to the running-off liquid, but is miscible with this liquid and with water, the rate of feed of said liquor being such that the volume of liquid matter enclosed in and surmounting said material remains practically unchanged and the liquid is merely supplanted by said liquor, which is thereafter expelled by washing with water.

6. The method of freeing solid and more particularly fibriform organic cellulose derivative material from a liquid mixture, with which it is imbibed and which contains a liquid immiscible with water, without a substantial reduction of the volume of liquid enclosed by the material under treatment, which comprises causing the liquid covering the material to run off, while at the same time feeding to the material a quantity, substantially equal to the quantity of liquid running-off, of an organic liquor, which is inert relative to said material and to the running-off liquid, but is miscible with this liquid and with water, the rate of feed of said liquor being such that the volume of liquid matter enclosed in and surmounting said material remains practically unchanged and the liquid is merely supplanted by said liquor, which is thereafter expelled with steam.

7. The method of freeing solid and more particularly fibriform organic cellulose derivative material from a liquid immiscible with water, with which it is imbibed, without a substantial reduction of the volume of liquid enclosed by the material under treatment, which comprises causing the liquid covering the material to run off, while at the same time feeding to the material a quantity, substantially equal to the quantity of liquid running-off, of an organic liquor, which is inert relative to said material and to the running-off liquid, but is miscible with this liquid, the rate of feed of said liquor being such that the volume of liquid matter enclosed in and surmounting said material remains practically unchanged and the liquid is merely supplanted by said liquor, digesting the material under treatment and the liquor with an aqueous washing medium, separating said medium and now expelling said liquor.

8. The method of freeing solid and more particularly fibriform organic cellulose derivative material from a liquid immiscible with water, with which it is imbibed, without a substantial reduction of the volume of liquid covering the material under treatment, which comprises causing the liquid adhering to the material to run off, while at the same time feeding to the material a quantity, substantially equal to the quantity of liquid running-off, of benzene, digesting the material under treatment and the benzene admixed to it with water, separating the water and now expelling the benzene.

9. The method of freeing solid and more particularly fibriform organic cellulose esters from a liquid, immiscible with water, which was used in the esterification process and with which it is imbibed, without removing same from the esterification vessel and without a substantial reduction of the volume of liquid covering the material under treatment, which comprises causing the liquid adhering to said material to run off, while at the same time feeding into the esterification vessel a quantity, substantially equal to the quantity of liquid running-off, of an organic liquor, which is inert relative to said material and to the running-off liquid, but is miscible with this liquid, the rate of feed of said liquor being such that the volume of liquid mater enclosed in and surmounting said material remains practically unchanged and the liquid is merely supplanted by said liquor which is thereafter expelled.

RICHARD MÜLLER.
MARTIN SCHENCK.
WILHELM WIRBATZ.